(12) United States Patent
Ishii et al.

(10) Patent No.: US 7,919,944 B2
(45) Date of Patent: Apr. 5, 2011

(54) MOTOR DRIVING CIRCUIT

(75) Inventors: Takaaki Ishii, Higashi Osaka (JP);
Takashi Tsukagoshi, Ashikaga (JP);
Akira Suzuki, Ota (JP)

(73) Assignees: Sanyo Electric Co., Ltd., Osaka (JP);
Sanyo Semiconductor Co., Ltd.,
Gunma (JP)

( * ) Notice: Subject to any disclaimer, the term of this patent is extended or adjusted under 35 U.S.C. 154(b) by 262 days.

(21) Appl. No.: 12/200,744

(22) Filed: Aug. 28, 2008

(65) Prior Publication Data
US 2009/0058328 A1 Mar. 5, 2009

(30) Foreign Application Priority Data
Aug. 29, 2007 (JP) ................ 2007-222428

(51) Int. Cl.
*H02P 1/04* (2006.01)
*H02P 6/20* (2006.01)
(52) U.S. Cl. .......... 318/430; 318/400.06
(58) Field of Classification Search .......... 318/599, 318/811, 685, 696, 557, 778, 400.03, 400.06, 318/400.07, 714, 430, 432
See application file for complete search history.

(56) References Cited

U.S. PATENT DOCUMENTS

| 4,906,910 A * | 3/1990 | Tanuma et al. ........... 318/696 |
| 6,104,151 A | 8/2000 | Tsai |
| 6,424,600 B1 * | 7/2002 | Okeya et al. ........... 368/204 |
| 2007/0024228 A1 * | 2/2007 | Fujinaka ........... 318/696 |

FOREIGN PATENT DOCUMENTS

| JP | 07184396 A * | 7/1995 |
| JP | 2000116163 A * | 4/2000 |
| JP | 2006-227101 | 8/2006 |

* cited by examiner

*Primary Examiner* — Walter Benson
*Assistant Examiner* — Eduardo Colon
(74) *Attorney, Agent, or Firm* — SoCal IP Law Group LLP; Steven C. Sereboff; John E. Gunther (57) ABSTRACT

A motor driving circuit for controlling a current amount flowing through a motor coil includes: a comparator configured to output a comparison signal indicating a comparison result between a set current amount and a current amount based on an inputted set current signal according to the set current amount and a current signal according to the current amount flowing through the motor coil; a current control signal update circuit configured to update a current control signal for controlling the current amount flowing through the motor coil in a stepwise manner so that the current amount flowing through the motor coil is changed to the set current amount in a stepwise manner, based on the comparison signal outputted from the comparator; and a driving circuit configured to drive the motor coil based on the current control signal outputted from the current control signal update circuit.

14 Claims, 8 Drawing Sheets

| STEP SIZE | 1 | 1 | 2 | 4 | 8 | 16 | 1 | 1 |
|---|---|---|---|---|---|---|---|---|
| STP0 | 0 | 1 | 0 | 1 | 0 | 1 | 0 | 1 |
| STP1 | 0 | 0 | 1 | 1 | 0 | 0 | 1 | 1 |
| STP2 | 0 | 0 | 0 | 0 | 1 | 1 | 1 | 1 |
| D0 | 1 | 1 | 0 | 1 | 1 | 1 | 1 | 1 |
| D1 | 1 | 1 | 1 | 0 | 1 | 1 | 1 | 1 |
| D2 | 1 | 1 | 1 | 1 | 0 | 1 | 1 | 1 |
| D3 | 1 | 1 | 1 | 1 | 1 | 0 | 1 | 1 |

FIG. 4

| D0 | 1 | 0 | 1 | 1 | 1 |
|---|---|---|---|---|---|
| D1 | 1 | 1 | 0 | 1 | 1 |
| D2 | 1 | 1 | 1 | 0 | 1 |
| D3 | 1 | 1 | 1 | 1 | 0 |
| SEL=0 CONDITION | ALL THE TIME | C0 = 1 | C0, C1 = 1 | C0~C2 = 1 | C0~C3 = 1 |
| STEP SIZE | 1 | 2 | 4 | 8 | 16 |

FIG. 5

| CURRENT SET AMOUNT | COUNTER OUTPUT | COMPARATOR OUTPUT (CMP3) | | | | SEL (STEP SIZE 4) | CURRENT CONTROL SIGNAL (CURRENT VALUE) |
| --- | --- | --- | --- | --- | --- | --- | --- |
| | | C3 | C2 | C1 | C0 | | |
| 00001010 | 00000000 | 0 | 1 | 0 | 1 | 0 | 00000000 |
| | 00000001 | 0 | 1 | 0 | 0 | 0 | |
| | 00000010 | 0 | 1 | 1 | 1 | 1 | 00000010 |
| | 00000011 | 0 | 1 | 1 | 0 | 0 | |
| | 00000100 | 0 | 0 | 0 | 1 | 0 | |
| | 00000101 | 0 | 0 | 0 | 0 | 0 | |
| | 00000110 | 0 | 0 | 1 | 1 | 1 | 00000110 |
| | 00000111 | 0 | 0 | 1 | 0 | 0 | |
| | 00001000 | 1 | 1 | 0 | 1 | 0 | |
| | 00001001 | 1 | 1 | 0 | 0 | 0 | |
| | 00001010 | 1 | 1 | 1 | 1 | 1 | 00001010 |

MOTOR DRIVING CIRCUIT

CROSS-REFERENCE TO RELATED APPLICATION

This application claims the benefit of priority to Japanese Patent Application No. 2007-222428, filed Aug. 29, 2007, of which full contents are incorporated herein by reference.

BACKGROUND OF THE INVENTION

1. Field of the Invention

The present invention relates to a motor driving circuit.

2. Description of the Related Art

A voice coil motor is often used as a motor for realizing an auto-focus function of a camera incorporated in a cellular phone. The voice coil motor is a motor in which a movement amount is changed according to a current amount, and a focus distance can be controlled by adjusting a position of a lens in the camera by the movement amount of the voice coil motor.

Figure 9:
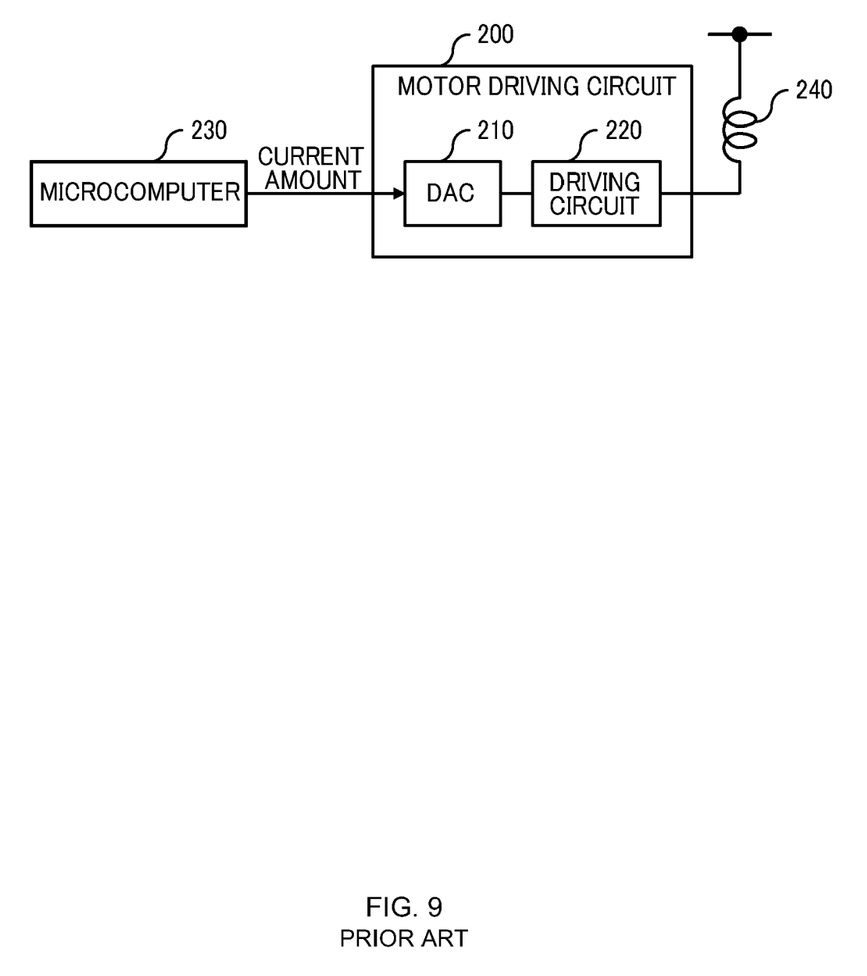
FIG. 9 is a diagram illustrating a configuration example of a general motor driving circuit for driving a voice coil motor.

FIG. 9 is a diagram illustrating a configuration example of a general motor driving circuit for driving a voice coil motor. A motor driving circuit 200 includes a DA converter (DAC) 210 and a driving circuit 220. At the motor driving circuit 200, control is carried out at the driving circuit 220 so that a current amount by a digital signal outputted from a microcomputer 230 is converted to an analog signal at a DAC 210, and the current amount of a voice coil motor 240 becomes the current amount outputted from the DAC 210.

When the voice coil motor 240 is driven using such motor driving circuit 200, a current amount flowing through the voice coil motor 240 needs to be changed according to the position in order to move the lens to a desired position. However, if the current amount of the voice coil motor 240 is rapidly changed, vibration of the voice coil motor 240 is increased, and time till the lens position is stabilized is prolonged. Thus, instead of sudden change of the current amount outputted from the microcomputer 230 to a target value according to a desired position, control of gradual change to the target value is executed in general (See Japanese Patent Laid-Open No. 2006-227101, for example).

However, if the current amount outputted from the microcomputer 230 is changed gradually, processing to appropriately update the current amount at the microcomputer 230 is required, which increases a processing load of the microcomputer 230.

SUMMARY OF THE INVENTION

According to an aspect of the present invention, a motor driving circuit for controlling a current amount flowing through a motor coil includes: a comparator configured to output a comparison signal indicating a comparison result between a set current amount and a current amount based on an inputted set current signal according to the set current amount and a current signal according to the current amount flowing through the motor coil; a current control signal update circuit configured to update a current control signal for controlling the current amount flowing through the motor coil in a stepwise manner so that the current amount flowing through the motor coil is changed to the set current amount in a stepwise manner, based on the comparison signal outputted from the comparator; and a driving circuit configured to drive the motor coil based on the current control signal outputted from the current control signal update circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
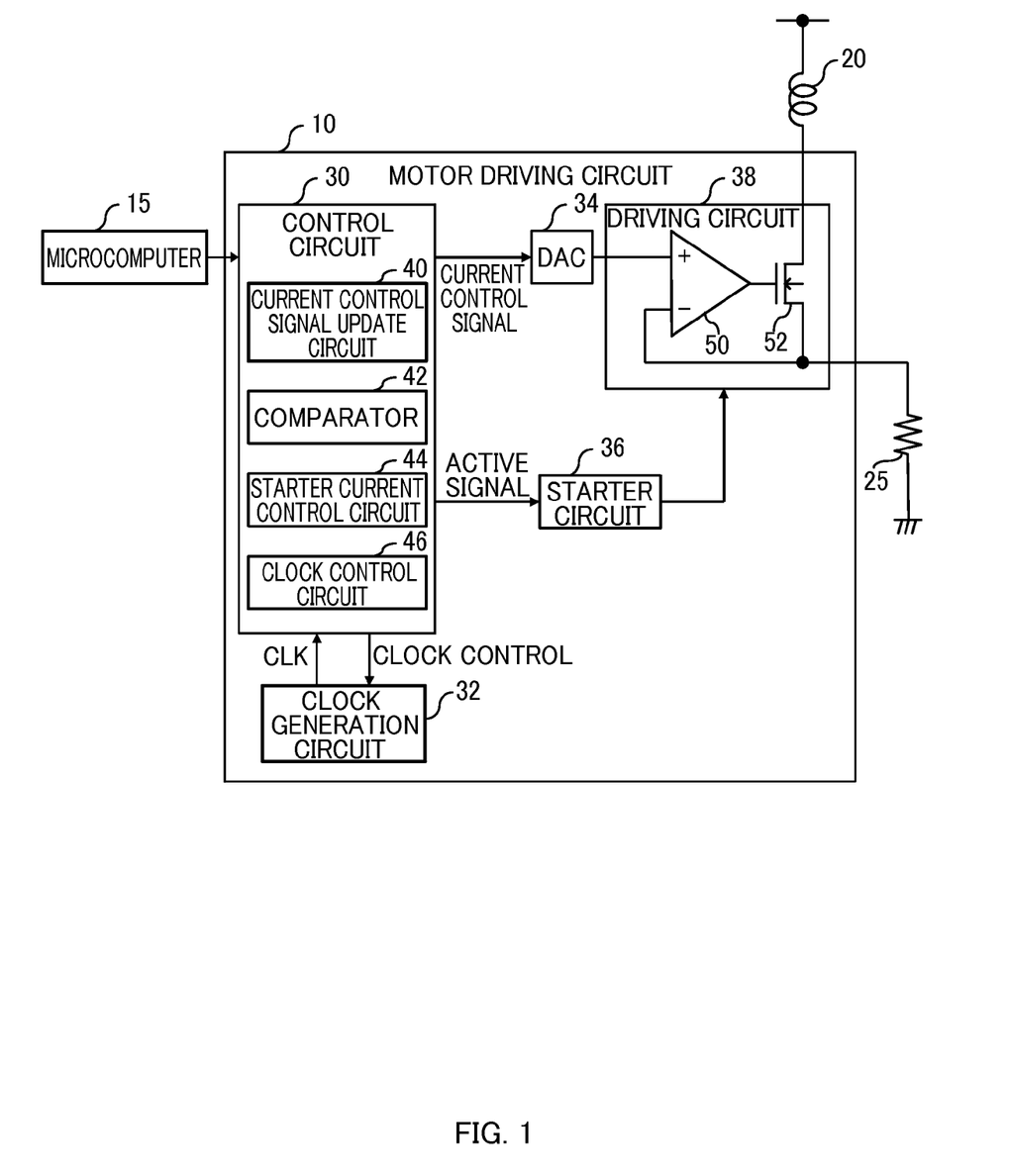
FIG. 1 is a diagram illustrating configuration of a motor driving circuit as an embodiment of the present invention.

FIG. 1 is a diagram illustrating configuration of a motor driving circuit as an embodiment of the present invention. A motor driving circuit 10 is a circuit for controlling a current amount flowing through a voice coil motor 20 (motor coil) by control from a microcomputer 15. The current amount flowing through the voice coil motor 20 is detected by a voltage generated at a resistance 25 connected in series to the voice coil motor 20. The voice coil motor 20 is a motor whose movement amount is changed according to the current amount and used, for example, for realizing an auto-focus function of a camera incorporated in a cellular phone.

The motor driving circuit 10 includes a control circuit 30, a clock generation circuit 32, a DA converter (DAC) 34, a starter circuit 36, and a driving circuit 38.

The control circuit 30 includes a current control signal update circuit 40, a comparator 42, a starter current control circuit 44, and a clock control circuit 46. The comparator 42 outputs a comparison signal indicating a comparison result between a set current amount (set current signal) inputted from the microcomputer 15 and a current amount flowing through the voice coil motor 20. The current control signal update circuit 40 updates and outputs a current control signal (current value) for controlling the current amount flowing through the voice coil motor 20 so that the current amount flowing through the voice coil motor 20 comes close to the set current amount in a stepwise manner. The starter current control circuit 44 outputs an active signal instructing stop of a starter current such as a bias current and the like used for start and the like of the driving circuit 38 when the current amount indicated by the current control signal outputted from the current control signal update circuit 40 is zero. The clock control circuit 46 outputs a clock control signal instructing stop of generation of a clock signal used at update of the current control signal in the current control signal update circuit 40 when the current control signal outputted from the current control signal update circuit 40 becomes the set current amount.

The clock generation circuit 32 includes an RC oscillator circuit and the like, for example, and generates a clock signal (CLK) of a predetermined frequency used for updating the current control signal at the control circuit 30. When the clock control signal instructing generation stop of the clock signal is outputted from the control circuit 30, the clock generation circuit 32 stops an oscillation operation so as to stop generation of the clock signal. The DAC 34 converts the current control signal in digital form outputted from the control circuit 30 to an analog signal (voltage signal) to be outputted. The starter circuit 36 is a circuit for generating a starter current such as a bias current and the like used for start and the like of the driving circuit 38. The starter circuit 36 stops generation of the starter current when an active signal instructing generation stop of the starter current is outputted from the control circuit 30. The driving circuit 38 includes an operational amplifier 50 and an N channel MOSFET 52 and operates so that a voltage at one end of the resistance 25 becomes equal to the voltage outputted from the DAC 34. That is, the current amount flowing through the motor coil 20 is controlled so as to become a current amount indicated by the current control signal outputted from the control circuit 30.

Figure 2:
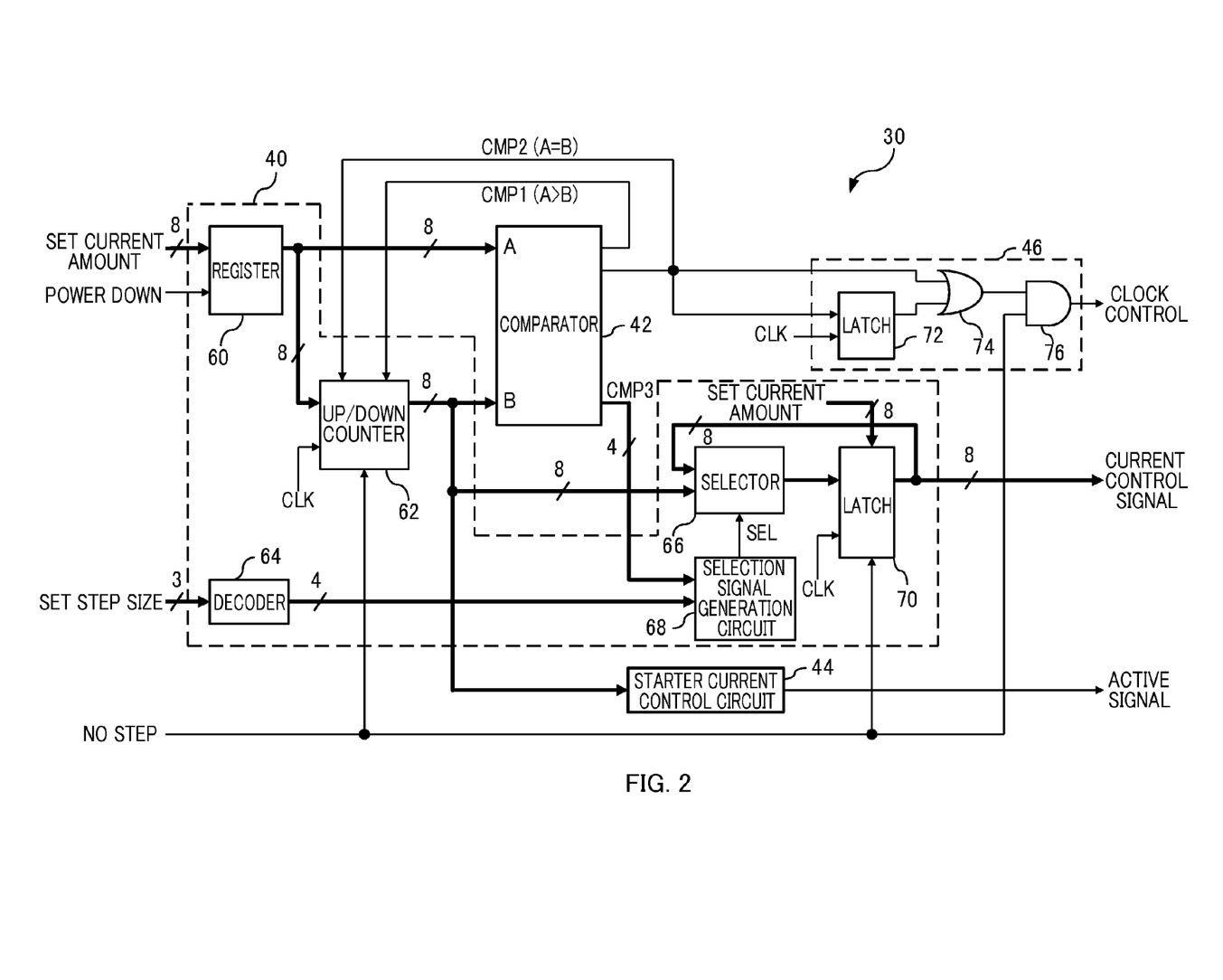
FIG. 2 is a diagram illustrating a configuration example of a control circuit.

FIG. 2 is a diagram illustrating a configuration example of the control circuit 30. The current control signal update circuit 40 includes a register 60, an up/down counter 62, a decoder 64, a selector 66, a selection signal generation circuit 68, and a latch 70. The clock control circuit 46 includes a latch 72, an NOR circuit 74, and an AND circuit 76.

In the register 60, a set current amount in digital form (8 bits in this embodiment) inputted from the microcomputer 15 is stored. Also, when a power down signal is inputted from the microcomputer 15 for bringing the current amount flowing through the voice coil motor 20 to zero, the set current amount stored in the register 60 is reset to zero.

The up/down counter 62 is a circuit for counting up or counting down a count value (control value: 8 bits in this embodiment) based on a comparison signal (CMP1, CMP2) outputted from the comparator 42 at timing according to the clock signal (CLK) (rise timing of the clock signal, for example). That is, the up/down counter 62 increases/decreases the count value by a predetermined step size (1 in this embodiment) based on the comparison signal (CMP1, CMP2) outputted from the comparator 42 so that the count value becomes the set current amount. If a no-step signal instructing immediate change to the set current amount not by stepwise update of the current amount flowing through the voice coil motor 20 is inputted from the microcomputer 15, the up/down counter 62 takes in the set current amount outputted from the register 60 and holds the taken-in set current amount as it is without increase/decrease. The no-step signal in this embodiment is "1" when the current amount flowing through the voice coil motor 20 is updated in a stepwise manner, while it is "0" when it is changed immediately to the set current amount.

The comparator 42 outputs a comparison signal (CMP1 to CMP3) obtained by comparing the set current amount outputted from the register 60 and the count value outputted from the up/down counter 62 for each bit. The comparison signal (CMP1) is a signal indicating if the set current amount is larger than the count value, and it is "1" when the set current amount is larger than the count value, while it is "0" when the set current amount is at the count value or less in this embodiment. The comparison signal (CMP2) is a signal indicating if the set current amount is equal to the count value or not and it is "0" if the set current value is equal to the count value, while it is "1" if they are not equal in this embodiment. The comparison signal (CMP3) is a signal indicating a comparison result for each bit of lower bits (4 bits in this embodiment) of the set current amount and the count value and it is "1" if they are equal for each bit in this embodiment, while it is "0" if they are not.

The decoder 64 outputs a signal (4 bits in this embodiment) obtained by decoding a set step size signal (3 bits in this embodiment) for setting a step size when updating the current amount flowing through the voice coil motor 20 from the microcomputer 15. It may be so configured that instead of receiving a no-step signal from the microcomputer 15, the no-step signal is generated inside the motor driving circuit 10 based on the set step size signal.

The selector 66 outputs either one of the current control signal, which is a digital signal indicating the current amount flowing through the voice coil motor 20 outputted from the latch 70, and the counter value outputted from the up/down counter 62 as input data of the latch 70 based on a selection signal (SEL). In this embodiment, if the selection signal (SEL) is "0", the current control signal outputted from the latch 70 is outputted and if the signal is "1", the count value outputted from the up/down counter 62 is outputted.

The selection signal generation circuit 68 changes the selection signal (SEL) so that the current control signal outputted from the latch 70 is updated by a step size specified by the set step size signal based on the set step size signal decoded by the decoder 64 and the comparison signal (CMP3) outputted from the comparator 42.

The latch 70 takes in and holds the signal outputted from the selector 66 at timing according to the clock signal (CLK) (rise timing of the clock signal, for example). If the no-step signal instructing immediate change of the current amount flowing through the voice coil motor 20 to the set current amount is inputted from the microcomputer 15, the set current amount is taken into the latch 70 regardless of the signal outputted from the selector 66.

The starter current control circuit 44 determines that the starter current such as a bias current and the like for starting the driving circuit 38 is not needed any more when the count value outputted from the up/down counter 62 becomes zero and outputs an active signal for stopping the starter current. The starter current control circuit 44 may change the active signal based on the current control signal outputted from the latch 70.

The latch 72 takes in and holds the comparison signal (CMP2) outputted from the comparator 42 at timing according to the clock signal (CLK) (rise timing of the clock signal, for example). From the OR circuit 74, a logical sum of the comparison signal (CMP2) and an output signal of the latch 72 is outputted, while from the AND circuit 76, a logical product of the output signal of the OR circuit 74 and the no-step signal is outputted as a clock control signal for controlling generation of the clock signal (CLK). That is, if the count value of the up/down counter 62 is equal to the set current amount or if the current amount flowing through the voice coil motor 20 is to be changed immediately to the set current amount, the clock control signal becomes "0" and clock generation at the clock generation circuit 32 is stopped.

Figure 3:
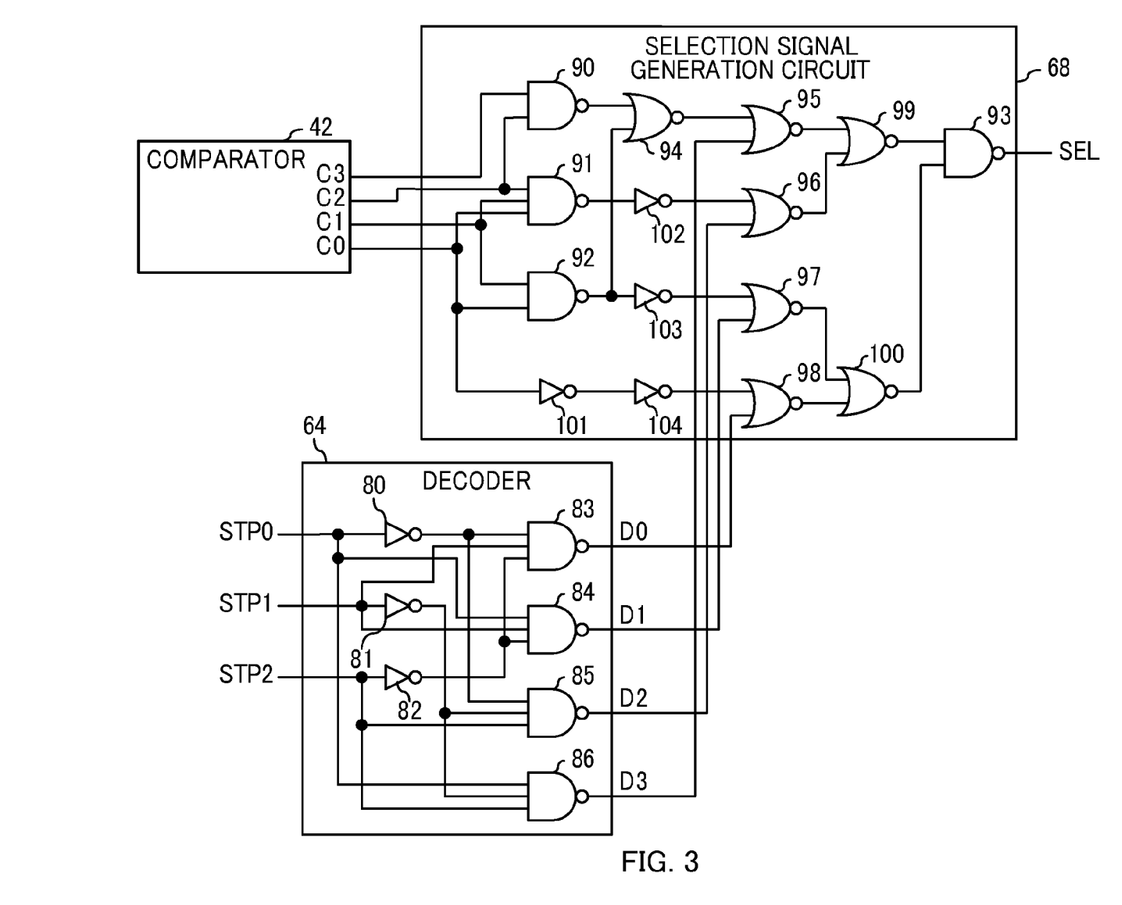
FIG. 3 is a diagram illustrating a configuration example of a decoder and a selection signal generation circuit.
Figure 4:
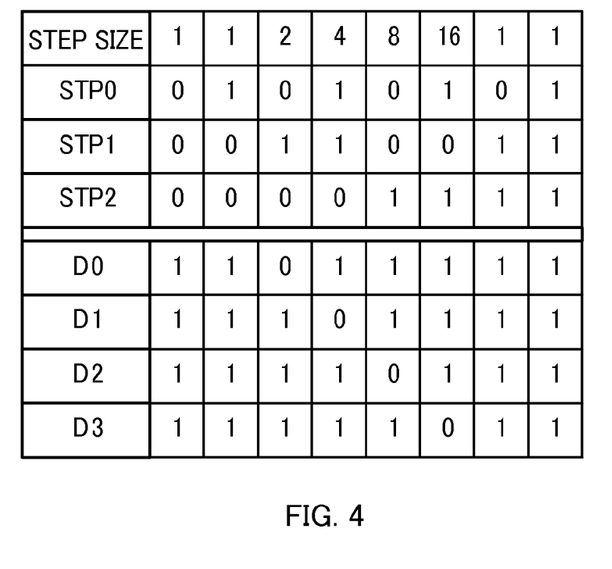
FIG. 4 is a diagram illustrating an example of a relation of input/output in the decoder.

FIG. 3 is a diagram illustrating a configuration example of the decoder 64 and the selection signal generation circuit 68. The decoder 64 includes NOT circuits 80 to 82 and NAND circuits 83 to 86. In this embodiment, the set step size signal is a signal of 3 bits (STP0 to STP2), and a 4-bit signal (D0 to D3) obtained by decoding the 3-bit signal (STP0 to STP2) is outputted. FIG. 4 is a diagram illustrating an example of a relation of input/output in the decoder 64. As shown in FIG. 4, the set step size signal (STP2, STP1, STP0) in this embodiment is "010" if the step size is "2", it is "011" if the step size is "4", it is "100" if the step size is "8", and it is "101" if the step size is "16". In these cases, output signals (D3, D2, D1, D0) are "1110", "1101", "1011", and "0111", respectively.

Figure 5:
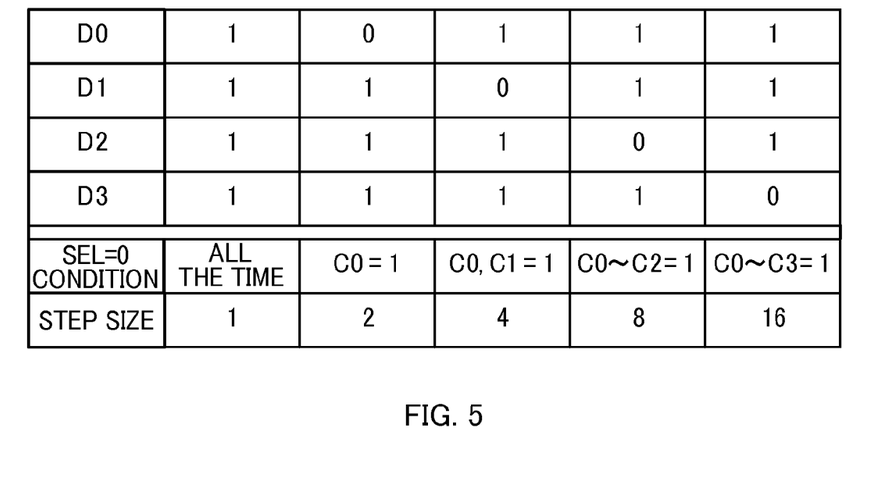
FIG. 5 is a diagram illustrating an example of a relation of input/output in a selection signal generation circuit.

The selection signal generation circuit 68 includes NAND circuits 90 to 93, NOR circuits 94 to 100 and NOT circuits 101 to 104. The comparison signal (CMP3) outputted from the comparator 42 is a signal (C0 to C3) obtained by comparing lower 4 bits of the current set value and the count value for each bit from the least significant bit in order. In this embodiment, if the values of the bits to be compared are equal, the signal (Cn) becomes "1", while if not, the signal becomes "0". And the selection signal generation circuit 68 changes the selection signal (SEL) based on the signal (C0 to C3) and the signal (D0 to D3). FIG. 5 is a diagram illustrating an example of a relation of input/output in the selection signal generation circuit 68. As shown in FIG. 5, if the signal (D3, D2, D1, D0) is "1111", the selection signal (SEL) is "0" all the time. That is, if the signal (D3, D2, D1, D0) is "1111", the count value of the up/down counter 62 is outputted from the selector 66 all the time, and the step size is "1". When the signal (D3, D2, D1, D0) is "1110", if the signal (C0) is "1", the selection signal (SEL) is "0", while the selection signal is "1" in the other cases. Here, the signal (C0) becomes "1" every two counts of the up/down counter 62, and if the signal (D3, D2, D1, D0) is "1110", the step size is "2". When the signal (D3, D2, D1, D0) is "1101", if the signal (C0) and the signal (C1) are both "1", the selection signal (SEL) is "0", while the selection signal is "1" in the other cases. Here, the signal (C0) and the signal (C1) both become "1" every four counts of the up/down counter 62, and if the signal (D3, D2, D1, D0) is "1101", the step size is "4". When the signal (D3, D2, D1, D0) is "1011", if all the signals (C0 to C2) are "1", the selection signal (SEL) is "0", while the selection signal is "1" in the other cases. Here, all the signals (C0 to C2) become "1" every eight counts of the up/down counter 62, and if the signal (D3, D2, D1, D0) is "1011", the step size is "8". When the signal (D3, D2, D1, D0) is "0111", if all the signals (C0 to C3) are "1", the selection signal (SEL) is "0", while the selection signal is "1" in the other cases. Here, all the signals (C0 to C3) become "1" every sixteen counts of the up/down counter 62, and if the signal (D3, D2, D1, D0) is "0111", the step size is "16".

Figure 6:
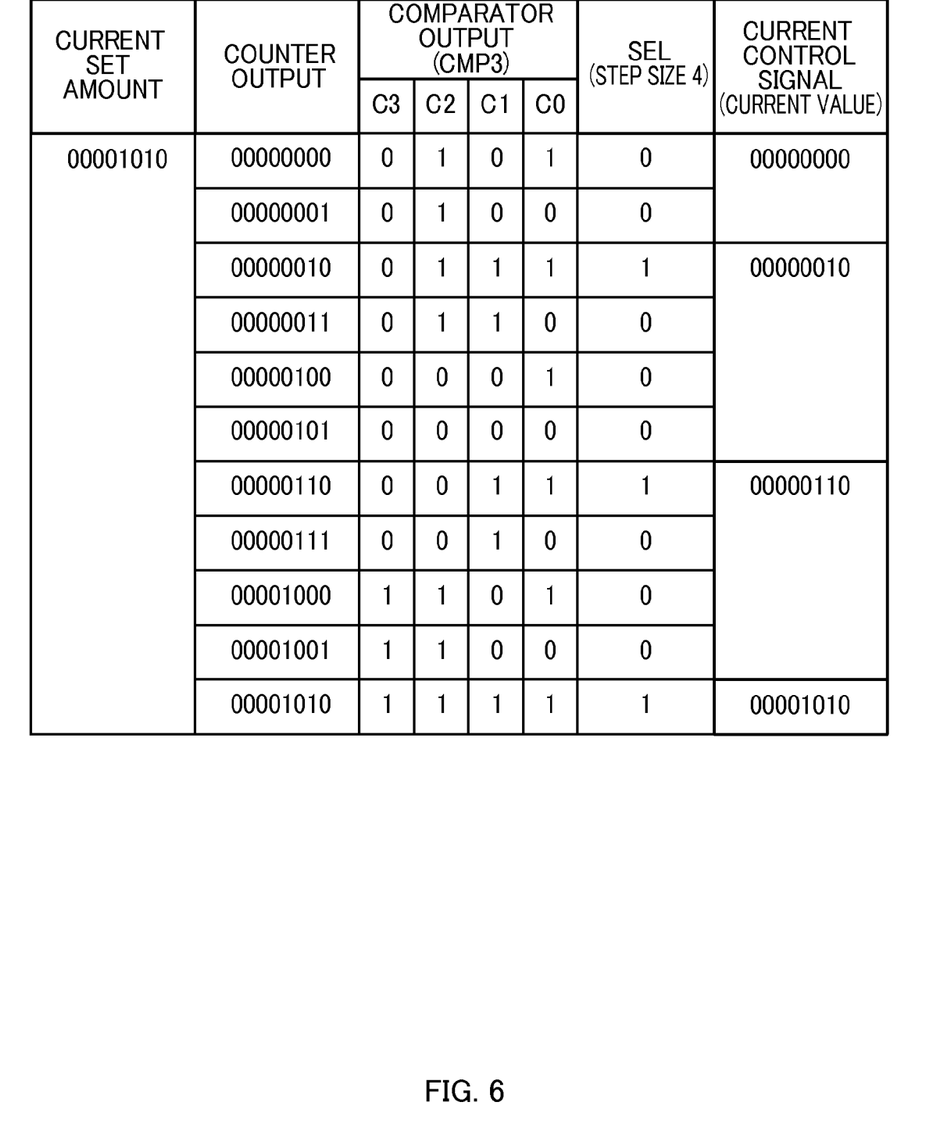
FIG. 6 is a diagram illustrating an example of an operation of a current control signal update circuit and a comparator.

FIG. 6 is a diagram illustrating an example of operations of the current control signal update circuit 40 and the comparator 42. In the example shown in FIG. 6, suppose that the current set value is "00001010" ("10" in decimal system), the set step size signal (STP2, STP1, STP0) is "011" (step size "4") and the count value at operation start of the up/down counter 62 is "00000000".

Under such condition, the count value of the up/down counter 62 is counted up by one according to the clock signal (CLK), and according to change in the count value, the comparison signal (C0 to C3) outputted from the comparator 42 is also changed.

If the step size is "4", at timing when the signal (C0) and the signal (C1) both become "1", that is, at timing when the lower 2 bits of the current set value and the lower 2 bits of the counter value become equal to each other, the selection signal (SEL) becomes "1", while the selection signal (SEL) becomes "0" at the timing other than that.

Therefore, in the state where the counter value is counted up to "00000001", for example, since the selection signal (SEL) is "0", the selector 66 outputs a signal outputted from the latch 70, and the current control signal outputted from the latch 70 is not changed. And if the counter value becomes "00000010" ("2" in decimal system), for example, the selection signal (SEL) becomes "1", and the selector 66 outputs a signal outputted from the up/down counter 62 and the current control signal outputted from the latch 70 is updated.

After that, the selection signal (SEL) becomes "1" at timing when the counter value becomes "00000110" ("6" in decimal system), "00001010" ("10" in decimal system), and the current control signal outputted from the latch 70 is updated. That is, the current control signal outputted from the current control signal update circuit 40 is changed to "2", "6", and "10" in decimal system by the step size of "4".

If the change amount from the initial value of the current control signal to the set current amount is not a multiple number of the step size, first, the current control signal is changed by a remainder obtained when the change amount is divided by the step size, and then, update is carried out with the set step size. For example, in the example in FIG. 6, since the change amount is "10" and it is not dividable by "4", the current control signal is first changed by "2", which is a remainder, and then, changed by the step size "4".

For example, if the set current amount or the set step size is changed in the middle of count-up or count-down of the count value toward the set current amount, the comparison signal (CMP1 to CMP3) outputted from the comparator 42 is also changed according to the change, and the current control signal outputted from the current control signal update circuit 40 is also changed according to the set current amount or set step size after the change.

Also, in the case of the step size of "1", that is, if the no-step signal is "0", the set current amount is taken into the latch 70 and is also into the up/down counter 62. Therefore, when the current control signal outputted from the current control signal update circuit 40 is to be updated by a size other than the step size "1", occurrence of mismatch between the count value of the up/down counter 62 and the current control signal outputted from the current control signal update circuit 40 can be prevented.

Figure 7:
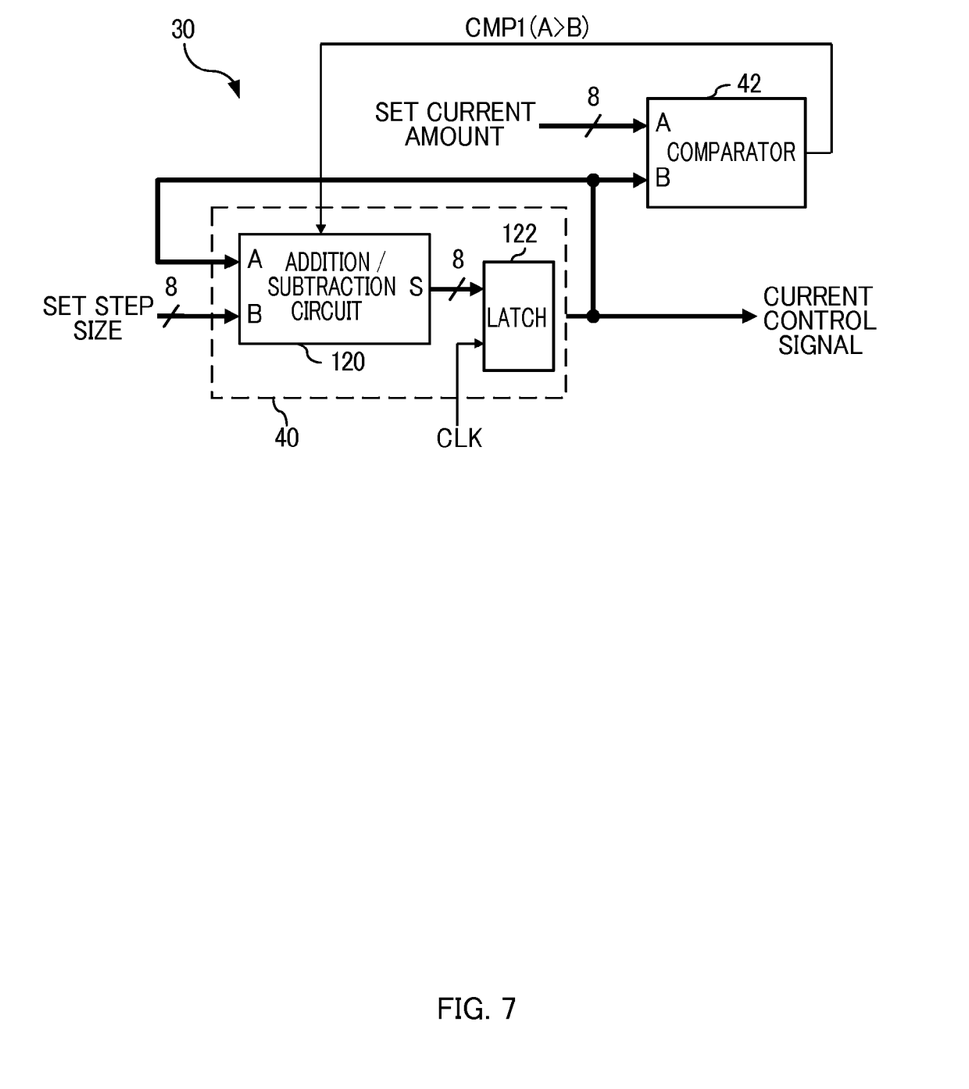
FIG. 7 is a diagram illustrating another configuration example of the control circuit.

FIG. 7 is a diagram illustrating another configuration example of the control circuit 30. As shown in FIG. 7, the current control signal update circuit 40 in the control circuit 30 may include an addition/subtraction circuit 120 and a latch 122.

The addition/subtraction circuit 120 is a circuit that adds or subtracts the current control signal in digital form outputted from the latch 122 by a step size indicated by the set step size signal from the microcomputer 15. In the example of FIG. 7, the set step size signal shall be an 8-bit signal, for example, when the step size is represented in the binary notation.

The latch 122 takes in a signal outputted from the addition/subtraction circuit 120 according to the clock signal (CLK) and outputs it as a current control signal for controlling a current amount flowing through the voice coil motor 20. The comparator 42 outputs the comparison signal (CMP1) indicating a comparison result between the set current amount from the microcomputer 15 and the current control signal outputted from the latch 122.

Into the addition/subtraction circuit 120, the comparison signal (CMP1) outputted from the comparator 42 is inputted, and the current control signal outputted from the latch 122 is outputted after addition or subtraction by a step size indicated by the set step size signal so that the current control signal outputted from the latch 122 becomes the set current amount.

Figure 8:
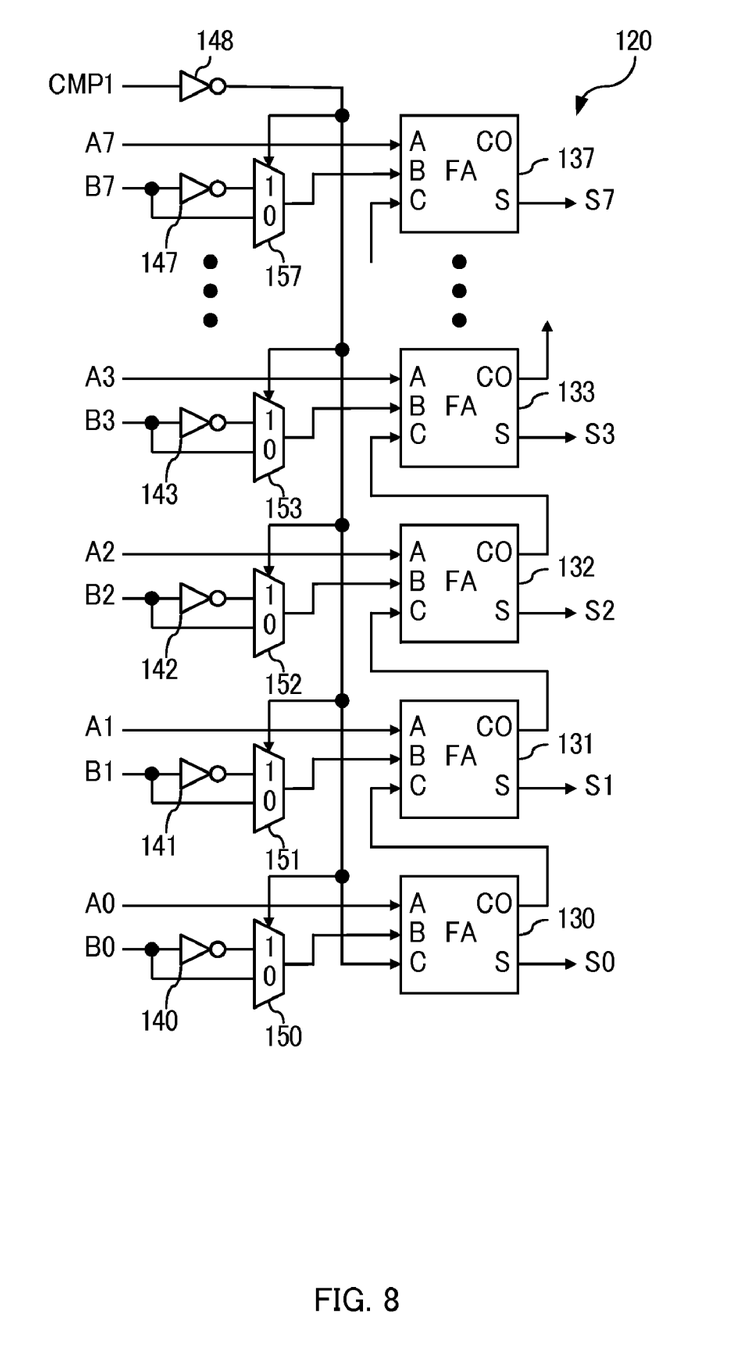
FIG. 8 is a diagram illustrating a configuration example of an addition/subtraction circuit.

FIG. 8 is a diagram illustrating a configuration example of the addition/subtraction circuit 120. The addition/subtraction circuit 120 includes full adders 130 to 137, NOT circuits 140 to 148, and selectors 150 to 157. The full adder 130 adds a 1-bit signal inputted to an input terminal A, a 1-bit signal inputted to an input terminal B, and a 1-bit carry signal inputted to an input terminal C together and outputs a 1-bit signal, which is an addition result, from an output terminal S and also outputs a 1-bit carry signal from an output terminal CO. The same applies to the full adders 131 to 137, and an 8-bit addition circuit is constituted by the full adders 130 to 137. Into the selectors 150 to 157, an 8-bit set step size signal (B0 to B7) and a signal obtained by reversing the set step size signal (B0 to B7) at the NOT circuits 140 to 147 are inputted sequentially from the lower bits. Also, into the selectors 150 to 157, a signal obtained by reversing the comparison signal (CMP1) from the comparator 42 at the NOT circuit 148 is inputted as a selection signal. And into the input terminals A of the full adders 130 to 137, current control signals (A0 to A7) outputted from the latch 122 are inputted and into the input terminals B, signals outputted from the selectors 150 to 157 are inputted.

In this embodiment, if a set current amount is larger than the current control signal outputted from the latch 122, the comparison signal (CMP1) becomes "1", while if smaller, it becomes "0". Therefore, if the set current amount is larger than the current control signal outputted from the latch 122, the set step size signals (B0 to B7) are outputted from the selectors 150 to 157, and signals (S0 to S7) in which the set step size signals (B0 to B7) are added to the current control signals (A0 to A7) outputted from the latch 122 are outputted from the full adders 130 to 137. Also, if the set current amount is at the current control signal outputted from the latch 122 or less, signals obtained by reversing the set step size signals (B0 to B7) are outputted from the selectors 150 to 157. At this time, "1" is inputted to the input terminal C of the full adder 130 as a carry signal. That is, the signal (S0 to S7) outputted from the full adders 130 to 137 is a signal in which a signal (a complement of 2 of the set step size signal) obtained by reversing the set step size signal (B0 to B7) and adding 1 is added to the current control signal (A0 to A7) outputted from the latch 122. In other words, the signal (S0 to S7) output from the full adders 130 to 137 is a signal in which the set step size signal (B0 to B7) is subtracted from the current control signal (A0 to A7).

As mentioned above, in the addition/subtraction circuit 120, addition or subtraction is carried out by a step size indicated by the set step size signal so that the current control signal outputted from the latch 122 is changed to the set current amount in a stepwise manner based on the comparison signal (CMP1) from the comparator 42.

In the control circuit 30 shown in FIG. 7, it may also be so configured that a clock control signal instructing generation stop of the clock signal (CLK) is outputted based on the comparison signal (CMP2) outputted from the comparator 42 similarly to FIG. 2. Furthermore, it may also be so configured that an active signal instructing generation stop of a starter current such as a bias current and the like is outputted when the current control signal outputted from the latch 122 becomes zero.

The motor driving circuit 10 of this embodiment has been described above. As mentioned above, in the motor driving circuit 10 of this embodiment, when the set current amount is inputted from the microcomputer 15, the current amount flowing through the voice coil motor 20 is changed to the set current amount in a stepwise manner by the current control signal update circuit 40. That is, when the current amount flowing through the voice coil motor 20 is to be changed to the set current amount in a stepwise manner, it is only necessary on the microcomputer 15 side to output the set current amount once, which can reduce a processing load of the microcomputer 15.

Also, in the motor driving circuit 10 of this embodiment, as shown in FIG. 2, by controlling the timing for outputting the count value of the up/down counter 62 to the latch 70 by the selector 66 according to the set step size signal, a single change amount of the current amount flowing through the voice coil motor 20 can be adjusted. That is, when a priority is to be given to restriction of vibration in the voice coil motor 20, a single movement amount of the voice coil motor 20 can be decreased by reducing the step size. Alternatively, if an influence by a noise generated when a signal for controlling the current amount flowing through the voice coil motor 20 is changed in a stepwise manner is to be restricted, the number of generation times of the noise can be reduced by increasing the step size.

In the motor driving circuit 10 of this embodiment, as shown in FIG. 2, based on the comparison signal (CMP3) outputted from the comparator 42 and the set step size signal, every time the set current amount and the count value of the up/down counter 62 become equal to each other in the lower bits in the bit number according to the set step size signal, the count value of the up/down counter 62 can be outputted as a signal for controlling the current amount flowing through the voice coil motor 20. By this arrangement, even if the change amount in the current amount flowing through the voice coil motor 20 is not a multiple number of the set step size, as exemplified in FIG. 6, such control is enabled that the current amount flowing through the voice coil motor 20 matches the set current amount.

Also, in the motor driving circuit 10 of this embodiment, as shown in FIG. 7, the current amount flowing through the voice coil motor 20 can be changed in a stepwise manner using the addition/subtraction circuit 120 in which an addition/subtraction value can be controlled by the set step size signal. Also in the configuration using the addition/subtraction circuit 120, a single change amount in the current amount flowing through the voice coil motor 20, influence of noise and the like can be adjusted by changing the step size according to the situation. In the configuration exemplified in FIG. 7, since the signal outputted from the addition/subtraction circuit 120 is taken into the latch 122 according to the clock signal (CLK), and time till the current amount flowing through the voice coil motor 20 becomes the set current amount can be reduced by increasing the step size.

Also, in the motor driving circuit 10 of this embodiment, when the current amount flowing through the voice coil motor 20 reaches the set current amount, a clock control signal instructing generation stop of the clock signal (CLK) is outputted. As a result, during a period when the clock signal (CLK) is not required, the generation of the clock signal (CLK) is stopped, which can restrict power consumption.

Also, in the motor driving circuit 10 of this embodiment, when the current amount flowing through the voice coil motor 20 becomes zero, an active signal instructing generation stop of the starter current for starting the driving circuit 38 is outputted. As a result, generation of the starter current is stopped while the starter current is not required, which can restrict power consumption.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor driving circuit for controlling a current amount flowing through a motor coil, the motor driving circuit comprising:
   a comparator configured to output a comparison signal indicating a comparison result between a set current amount and a current amount based on an inputted set current signal according to the set current amount and a current signal according to the current amount flowing through the motor coil;
   a current control signal update circuit configured to update a current control signal for controlling the current amount flowing through the motor coil in a stepwise manner so that the current amount flowing through the motor coil is changed to the set current amount in a stepwise manner, based on the comparison signal outputted from the comparator; and
   a driving circuit configured to drive the motor coil based on the current control signal outputted from the current control signal update circuit.

2. The motor driving circuit according to claim 1, wherein the current control signal update circuit includes:
   an increase/decrease circuit configured to increase/decrease by a predetermined step size according to an inputted clock signal a control value for controlling the current amount flowing through the motor coil so that the current amount flowing through the motor coil is changed to the set current amount in a stepwise manner, based on the comparison signal outputted from the comparator; and
   a step size control circuit configured to output the control value as the current control signal every time the control value outputted from the increase/decrease circuit is changed by a set step size, based on an inputted set step size signal according to the set step size.

3. The motor driving circuit according to claim 2, wherein:
   the comparator is further configured to output the comparison signal indicating a comparison result obtained by comparing for each bit between the set current amount indicated by the set current signal and the control value outputted from the increase/decrease circuit; and
   the step size control circuit is further configured to output the control value as the current control signal every time the set current amount and the control value are equal to each other in lower bits of the bit number according to the set step size signal, based on the comparison signal outputted from the comparator and the set step size signal.

4. The motor driving circuit according to claim 3, further comprising
   a clock control circuit configured to stop generation of the clock signal when the current amount flowing through the motor coil reaches the set current amount based on the comparison signal outputted from the comparator.

5. The motor driving circuit according to claim 4, further comprising
   a starter current control circuit configured to stop generation of a starter current for starting the driving circuit when the current amount flowing through the motor coil becomes zero based on the current control signal outputted from the current control signal update circuit.

6. The motor driving circuit according to claim 2, further comprising
   a clock control circuit configured to stop generation of the clock signal when the current amount flowing through the motor coil reaches the set current amount based on the comparison signal outputted from the comparator.

7. The motor driving circuit according to claim 6, further comprising
   a starter current control circuit configured to stop generation of a starter current for starting the driving circuit when the current amount flowing through the motor coil becomes zero based on the current control signal outputted from the current control signal update circuit.

8. The motor driving circuit according to claim 2, further comprising
   a starter current control circuit configured to stop generation of a starter current for starting the driving circuit when the current amount flowing through the motor coil becomes zero based on the current control signal outputted from the current control signal update circuit.

9. The motor driving circuit according to claim 3, further comprising
   a starter current control circuit configured to stop generation of a starter current for starting the driving circuit when the current amount flowing through the motor coil becomes zero based on the current control signal outputted from the current control signal update circuit.

10. The motor driving circuit according to claim 1, wherein the current control signal update circuit includes:
    an addition/subtraction circuit configured to add/subtract by a set step size based on an inputted set step size signal according to the set step size a control value for controlling the current amount flowing through the motor coil so that the current amount flowing through the motor coil is changed to the set current amount in a stepwise manner, based on the comparison signal outputted from the comparator; and
    a latch circuit configured to latch according to an inputted clock signal the control value outputted from the addition/subtraction circuit and thereafter output the control value as the current control signal, and wherein
    the comparator is further configured to output as the comparison signal a comparison result between the set current amount indicated by the set current signal and the current control signal outputted from the latch circuit.

11. The motor driving circuit according to claim 10, further comprising
    a clock control circuit configured to stop generation of the clock signal when the current amount flowing through the motor coil reaches the set current amount based on the comparison signal outputted from the comparator.

12. The motor driving circuit according to claim 11, further comprising
    a starter current control circuit configured to stop generation of a starter current for starting the driving circuit when the current amount flowing through the motor coil becomes zero based on the current control signal outputted from the current control signal update circuit.

13. The motor driving circuit according to claim 10, further comprising
    a starter current control circuit configured to stop generation of a starter current for starting the driving circuit when the current amount flowing through the motor coil becomes zero based on the current control signal outputted from the current control signal update circuit.

14. The motor driving circuit according to claim 1, further comprising
    a starter current control circuit configured to stop generation of a starter current for starting the driving circuit when the current amount flowing through the motor coil becomes zero based on the current control signal outputted from the current control signal update circuit.

* * * * *